Figure 1:
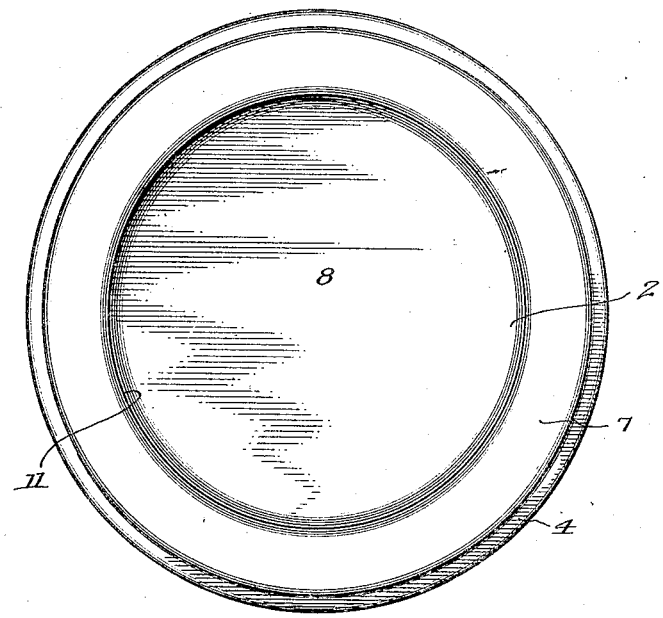

May 18, 1926.

L. OSTER 1,584,888

DISH OR PLATE

Filed May 29, 1924

Inventor

Lawrence Oster.

By
Attorney

Patented May 18, 1926.

1,584,888

UNITED STATES PATENT OFFICE.

LAWRENCE OSTER, OF MILWAUKEE, WISCONSIN.

DISH OR PLATE.

Application filed May 29, 1924. Serial No. 716,732.

This invention relates to a dish or plate; it has especial reference to feeding dishes for children; and it is characterized by certain unique features.

The primary object of the invention is to produce a dish or plate that shall be of such construction as to be sanitary in that it includes no grooves or corners for the accumulation of dirt.

Another object of the invention is to provide a dish having its walls spaced apart to provide an air-tight compartment to contain air or other medium adapted to become heated or cooled by reason of the radiation of heat or cold imparted to it as the walls themselves absorb heat or cold from the food placed in the dish, whereby such food is kept warm or cool, as the case may be.

Another and more specific object of the invention is to form the bowl of the dish so that the walls shall be curved in order that the removal of the food therefrom may be facilitated.

The dish or plate may be made of any suitable material; but in this instance I prefer, for obvious reasons, to make it of aluminum or similar metal because of the well-known characteristics thereof.

In the accompanying drawings, I have illustrated one embodiment of the invention; it being understood, however, that the drawing is merely illustrative and that my inventive-concept is susceptible of other embodiments and utilizations, and that the illustrated embodiment likewise is susceptible of a wide range of variation and modification without departing from the spirit of the invention or sacrificing any of the salient features and underlying principles thereof.

Figure 2:
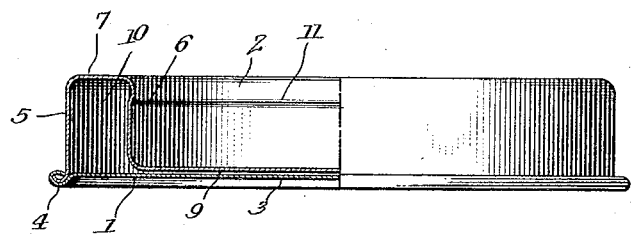

In these drawings:

Figure 1 is a view in plan of the dish or plate constructed in accordance with my invention; and Fig. 2 is a view, partly in vertical section and partly in elevation, of my invention.

Referring to these drawings, the reference-character 1 designates the bottom or base-portion of the dish and 2 the bowl-portion thereof. The base-portion is formed, as by stamping, to provide a horizontal section 3, the periphery of which is turned, as at 14, for a purpose presently to be described.

The bowl-section 2 includes an outer-wall 5, an inner-wall 6, a top-wall 7 joining the side-walls, and a botom-wall 8, the latter being spaced from the horizontal section 3 of the base-portion to provide a space 9, as shown in Fig. 2. The wall 5 is fitted into the turned extremity 4 of the bottom-portion 1 and, thus, the two portions are interlocked.

The walls 5 and 6 of the bowl-portion are separated to provide a space 10 which communicates with the space 9.

The wall 6 is bulged at its upper portion to provide an annular rim 11, as shown.

Both the bowl-portion and the botom-portion of the dish are formed in any appropriate manner, as by being pressed into form or by being spun into the required shape.

The dish thus formed is not only useful for feeding children, but it is of such a character as easily to be kept clean, and in a sanitary condition. Moreover, the spaces 9 and 10 provide a compartment in which a suitable heat-absorbing medium, such as air or fluid, may be housed, and the temperature of which is determined by the contents of the dish; if in heated condition, the medium in said spaces will be heated and thereby keep the contents of the dish warm, or if the contents—such as ice cream—of the dish be cold, the air in the spaces will be chilled and thereby keep the contents of the dish cool.

The joining of the two portions 1 and 2 is such as to make the compartment between them air-tight.

What I claim is:

1. A feeding dish comprising a bottom-portion crimped at its periphery, a bowl-portion including a bottom-section, and two spaced-apart wall sections, the outer wall-section being interlocked at the crimped periphery of the bottom-portion, the inner wall-section being formed with an annular rim.

2. A feeding dish comprising a bottom portion crimped at its periphery, a bowl-portion including a bottom section, a flat annular top, and two spaced apart wall-sections, the base of the outer wall-section being interlocked with the crimped periphery of the bottom portion to define a permanently closed air compartment.

3. A feeding dish comprising a bowl portion including a bottom wall, a pair of spaced parallel side walls and a top wall integral with and connecting said side walls; and a bottom fast at its periphery to one of said side walls and spaced from said bottom wall to define with said bowl portion an air tight compartment.

4. A feeding dish comprising a bowl portion including a bottom wall, a pair of spaced parallel side walls and a top wall integral with and connecting said side walls; and a bottom fast at its periphery to one of said side walls and spaced from said bottom wall to define with said bowl portion an air tight compartment, one of said side walls being formed adjacent said top wall with an inwardly projecting annular rim.

5. A feeding dish comprising a one piece bowl portion formed to provide a bottom, an inner side wall having an inwardly extending annular bead, a flat run, and an outer side wall paralleling said inner wall and having at its base an out-turned flange; and a flat base spaced from said bottom and crimped over said flange to define with said bowl portion an air tight compartment surrounding said inner wall and between said bottom and base.

6. A feeding dish comprising a one piece bowl portion formed to provide a bottom, an inner side wall, a flat run, and an outer side wall paralleling said inner wall and having at its base an out-turned flange; and a flat base spaced from said bottom and crimped over said flange to define with said bowl portion an air tight compartment surrounding said inner wall and between said bottom and base.

In testimony whereof I affix my signature.

LAWRENCE OSTER.